(12) United States Patent
Li et al.

(10) Patent No.: US 8,494,729 B2
(45) Date of Patent: Jul. 23, 2013

(54) METHOD TO DETERMINE TORQUE

(75) Inventors: Dongxu Li, Warren, MI (US); Farzad Samie, Franklin, MI (US); Chunhao J. Lee, Troy, MI (US); Chi-Kuan Kao, Troy, MI (US); Kumaraswamy V. Hebbale, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 358 days.

(21) Appl. No.: 12/892,838

(22) Filed: Sep. 28, 2010

(65) Prior Publication Data

US 2012/0078476 A1    Mar. 29, 2012

(51) Int. Cl.
*G06F 7/00* (2006.01)
(52) U.S. Cl.
USPC .......................................... 701/51; 180/197
(58) Field of Classification Search
USPC ........ 701/51, 67, 93, 22, 69, 70, 55; 180/248, 180/250, 65.5, 197; 192/35, 84.93, 218, 54.52; 475/86, 249, 149, 5, 198
See application file for complete search history.

(56) References Cited

U.S. PATENT DOCUMENTS 7,559,259 B2 *   7/2009   Fruhwirth et al. ....... 73/862.321
2008/0011103 A1   1/2008   Fruhwirth et al.

\* cited by examiner

*Primary Examiner* — Thomas Black
*Assistant Examiner* — Luke Huynh

(57) ABSTRACT

A powertrain includes a transmission coupled to a driveline. A method for monitoring torque in the powertrain includes monitoring signal outputs from a first rotational sensor and a second rotational sensor configured to monitor respective rotational positions of first and second locations of a driveline, determining a positional relationship between the first and second locations using positional identifiers of the first and second rotational sensors, deriving a twist angle from the positional relationship between the first and second rotational sensors, calculating a magnitude of driveline torque corresponding to the twist angle, and controlling the vehicular powertrain according to the calculated magnitude of driveline torque.

17 Claims, 4 Drawing Sheets

METHOD TO DETERMINE TORQUE

TECHNICAL FIELD

This disclosure is related to detecting torque output of an automotive powertrain.

BACKGROUND

The statements in this section merely provide background information related to the present disclosure and may not constitute prior art.

A consideration of vehicle driveability is powertrain output and vehicle response to that output. Powertrain output can be referred to as a twisting force known as torque. Torque is the twisting force generated from an internal combustion engine, or other torque source, e.g., electric motor, to propel the vehicle. In the case of an automobile or other vehicle with drive wheels, torque may be transferred through a transmission, split by a differential, and provided to wheels to provide tractive force to the vehicle.

Torque information can be used in a variety of powertrain control schemes, e.g., clutch fill-time detection, engine torque estimation, transmission shift smoothing, etc., which aid in vehicle drivability. Therefore, torque information can be used for added control of the powertrain. For example, during acceleration and deceleration, occupants of a vehicle can detect changes in torque transferred, e.g., during transmission shifts. Control schemes that control the transmission shifting can be utilized to minimize torque disturbances during shifting. A closed-loop control scheme can be used for transmission shifting allowing a control module to estimate the amount of torque being produced in a current transmission gear ratio based on an amount of torque the engine should be producing at a given RPM level. However, this is a theoretical torque and not necessarily representative of the actual torque being transferred. A control scheme can be devised for engine and transmission control based on a dedicated torque sensor. Dedicated torque sensors are able to detect an actual amount of torque being transferred and provide the actual torque information to the control module for determining a transmission shift scheme based on current conditions. However, dedicated torque sensors for use in production vehicles increase cost, part content, wiring harness complexity, mass and reliability issues.

SUMMARY

A powertrain includes a transmission coupled to a driveline. A method for monitoring torque in the powertrain includes monitoring signal outputs from a first rotational sensor and a second rotational sensor configured to monitor respective rotational positions of first and second locations of a driveline, determining a positional relationship between the first and second locations using positional identifiers of the first and second rotational sensors, deriving a twist angle from the positional relationship between the first and second rotational sensors, calculating a magnitude of driveline torque corresponding to the twist angle, and controlling the vehicular powertrain according to the calculated magnitude of driveline torque.

BRIEF DESCRIPTION OF THE DRAWINGS

One or more embodiments will now be described, by way of example, with reference to the accompanying drawings, in which.

DETAILED DESCRIPTION

Figure 1:
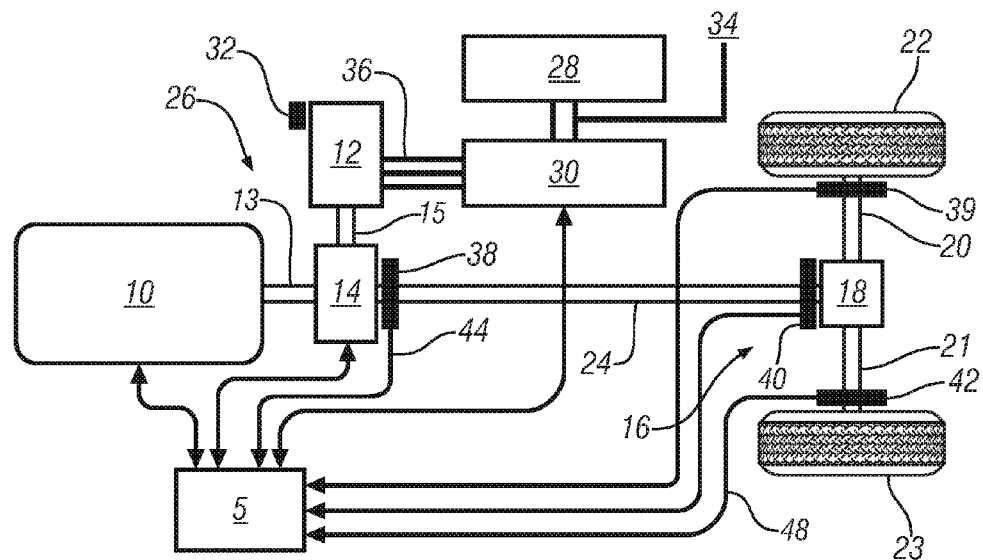
FIG. 1 is a schematic depiction of a vehicle hybrid powertrain system including an internal combustion engine and motor/generator(s), in accordance with the present disclosure.

Referring now to the drawings, wherein the showings are for the purpose of illustrating certain exemplary embodiments only and not for the purpose of limiting the same, FIG. 1 schematically shows a hybrid powertrain system 26 including an internal combustion engine 10 and motor/generator(s) 12. It should be noted that the hybrid powertrain is illustrative of this disclosure and should not be considered restrictive as different types of vehicular powertrains, including hybrid powertrains and non-hybrid powertrains, are contemplated herein. The engine 10 can be coupled to a transmission device 14 to transmit tractive torque to a driveline 16 of a vehicle. The driveline 16 includes a differential gear device 18 that mechanically couples to a first half-shaft 20 and a second half-shaft 21 that mechanically couples to a first wheel 22 and a second wheel 23 in one embodiment. The differential gear device 18 is coupled to an output member 24 of the hybrid powertrain system 26. The driveline 16 transfers tractive power between the transmission 14 and a road surface via the first and second wheels 22, 23.

The hybrid powertrain system 26 includes an energy storage device (ESD) 28, e.g., a battery, that stores electrical energy and is electrically connected to one or more electric motor/generator(s) 12, to transfer power therebetween. A transmission power inverter control module (TPIM) 30 is positioned between the ESD 28 and the motor/generator(s) 12 and is used to transform battery power from direct current to alternating current and back again. The motor/generator(s) 12 convert stored energy to mechanical power and convert mechanical power to energy that can be stored in the ESD 28. The engine 10 converts fuel to mechanical power.

The motor/generator(s) 12 preferably include a three-phase AC machine(s), including a stator, a rotor, and a resolver(s) 32. The motor stator for motor/generator(s) 12 is grounded to an outer portion of a transmission case, and includes a stator core with coiled electrical windings extending therefrom. The rotor(s) for the motor/generator(s) 12 are secured to transfer torque through the transmission 14 to the driveline 16 via shaft 15.

The resolver(s) 32 preferably includes a variable reluctance device including a resolver stator and a resolver rotor. The resolver(s) 32 are appropriately positioned and assembled on the motor/generator(s) 12. The respective stator (s) of the resolver(s) 32 are connected to the stator(s) for the motor/generator(s) 12. The resolver rotors are connected to the rotor for the motor/generator(s) 12. The resolver(s) 32 is signally and operatively connected to the TPIM 30 and senses and monitors rotational position of the resolver rotor relative to the resolver stator, thus providing actual rotational position of the motor/generator(s) 12. Additionally, the signal output from the resolver(s) 32 is interpreted to provide the rotational speed for the motor/generator(s) 12. When an electric only mode is providing torque to the drivetrain 16, the resolver is capable of providing rotational information similar to a rotational sensor.

The input torque from the engine 10 and the motor torques from the motor/generator(s) 12 are generated as a result of energy conversion from fuel or electrical potential energy stored within the ESD 28. The ESD 28 is high voltage DC-coupled to the TPIM 30 via DC transfer conductors 34. The transfer conductors 34 provide switchable electric current flow between the ESD 28 and the TPIM 30. The TPIM 30 transmits electrical power to and from the motor/generator(s) 12 by transfer conductors 36 to meet the torque commands in response to a motor torque request. Electrical current is transmitted to and from the ESD 28 in accordance with whether the ESD 28 is being charged or discharged.

Mechanical power from the engine 10 can be transferred to the transmission 14 via shaft 13. Mechanical power from the motor/generator(s) 12 can be transferred to the transmission 14. Mechanical power from the driveline 16 can be transferred to the engine 10 and the torque machine(s) 16 via the transmission 14 via the output member 24. The engine 10 is utilized in combination with the motor/generator(s) 12 for transferring torque to the driveline 16 thereby providing tractive torque through the first and second wheels 22, 23. The transferred mechanical power can be in the form of tractive torque for vehicle propulsion, and in the form of reactive torque for vehicle braking associated with regenerative braking functionality. As will be apparent to one of ordinary skill in the art, other hybrid configurations, e.g., series hybrid, parallel hybrid, or compound hybrid drive, non-hybrid configurations, and electric drive vehicles may be used without varying from the scope of the disclosure.

A first output rotational sensor 38 is positioned on the output member 24 preferably near the transmission 14. In a first embodiment, a first rotational sensor 39 is positioned distally relative to the first output rotational sensor 38 on one of the half-shafts. It is appreciated that the first output rotational sensor 38 is rotationally coupled to the first rotational sensor vis-à-vis the output member 24 and differential 18. In a second embodiment, additionally a second rotational sensor 42 is positioned distally relative to the first output rotational sensor on the other one of the half-shafts. It is appreciated that the first output rotational sensor 38 is rotationally coupled to the second rotational sensor vis-à-vis the output member 24 and differential 18. For purposes of this description, the first rotational sensor 39 corresponds to the first half-shaft 20 and the second rotational sensor 42 corresponds to the second half-shaft 21. The first and second rotational sensors 39, 42 are preferably positioned adjacent to corresponding first and second wheels 22, 23. In yet a third embodiment as an alternative to either the first or second embodiments, a second output rotational sensor 40 is positioned distally relative to the first output rotational sensor 38 but still on the output member 24 (e.g. adjacent the differential 18). Thus, it is appreciated that in all embodiments the first output rotational sensor 38 is rotationally coupled to at least one additional distally-positioned rotational sensor. The first output rotational sensor 38, first rotational sensor 39, second rotational sensor 42, and second output rotational sensor as the case may be are signally connected to a control module 5 to provide signals thereto. When the hybrid powertrain system 26 is being operated in electric only mode, the resolvers 32 can provide the rotational information of the first output rotational sensor 38 when transmission losses are calculated therewith. The control module 5 is signally and operatively connected to the engine 10 and TPIM 30 for providing communication therebetween and control thereof.

Each of the first and second output rotational sensors 38, 40 and first and second rotational sensors 39, 42 are rotational position sensors from which speed can be derived. Signals from the rotational sensors are substantially periodic during constant or steady state rotation of the driveline. An exemplary rotational sensor may include a toothed gear fabricated from a ferromagnetic material secured to a rotating element, e.g., a rotating shaft, which passes by a hall-effect sensor. Each tooth that passes the hall-effect device produces an electrical current that can be discerned in number, by duration, dwell, and by amplitude. A full signal corresponds to a tooth time period (i.e. from the beginning or ending of a tooth to the same beginning or ending of an adjacent tooth). A partial signal corresponds to a portion of a tooth time period. Since the number of teeth on the toothed gear is known, a speed can be calculated by counting full and partial signals produced within a sample window. Other exemplary sensors are bearingless wheelset, wheelset pulse generator, optical, and similar wheel rotational sensors producing periodic signals.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The control module 5 can control the hybrid powertrain system 26 to produce torque in response to an operator torque request. The control module 5 controls the engine 10, the motor/generator(s) 12, and the transmission 14 in combination to produce the operator torque request. The control module 5 can command the engine 10 and motor/generator(s) 12 to produce the requested torque individually or in combination. The transmission 14 is controlled to selectively transmit torque to the driveline 16 and includes multiple gear ratios that act as a torque multiplier to achieve the final operator torque request. Torque output can be used to control operation of the hybrid powertrain system 26 in response to the operator torque request using a suitable torque control scheme.

Figure 2:
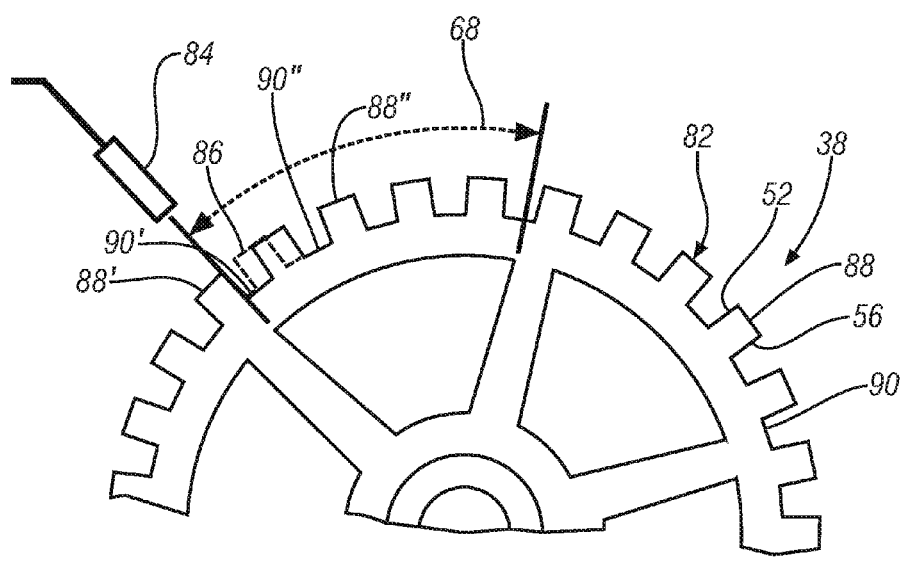
FIG. 2 is a schematic representation of the rotational sensor depicting the toothed element and sensor, in accordance with the present disclosure.

FIG. 2 is a schematic representation of the rotational sensors, e.g., first and second output rotational sensors 38, 40, respectively, depicting the toothed element 82 and sensor 84. The toothed element 82 is located on a rotating element, such as the output member 24 and includes a plurality of teeth 88 equally spaced apart from each other. Each tooth 88 is separated from adjacent teeth by a space 90 and has a rising edge 52 and a falling edge 56 assuming a counter-clockwise rotation in FIG. 2. The sensor 84 is located adjacent the toothed element 82 and monitors the individual teeth 88 of the toothed element 82. A sample window 68 is graphically represented as the dotted line wherein a certain number of teeth 88 will be detected within a particular sample time period, in this example 25 ms, when the toothed element 82 is rotating at a known speed.

A positional identifier 86 is shown within the sample window 68. The positional identifier 86 is one of the teeth 88 that is discernibly different in construction or placement relative to the other teeth 88 on the toothed element 82. The positional identifier 86 as depicted is a similarly shaped tooth 88 as the remainder of the teeth 88 but is positioned closer to the preceding tooth 88' and further from the following tooth 88", e.g., the space 90' between the preceding tooth 88' and the positional identifier 86 is less than the remaining spaces 90 and the space 90" between the positional identifier 86 and the following tooth 88" is greater than the remaining spaces 90. However, the positional identifier 86 can also be of a different shape, i.e., wider, shorter, and taller, than the remainder of the teeth 88 provided the sensor 84 can detect a distinct profile associated therewith.

Figure 3:
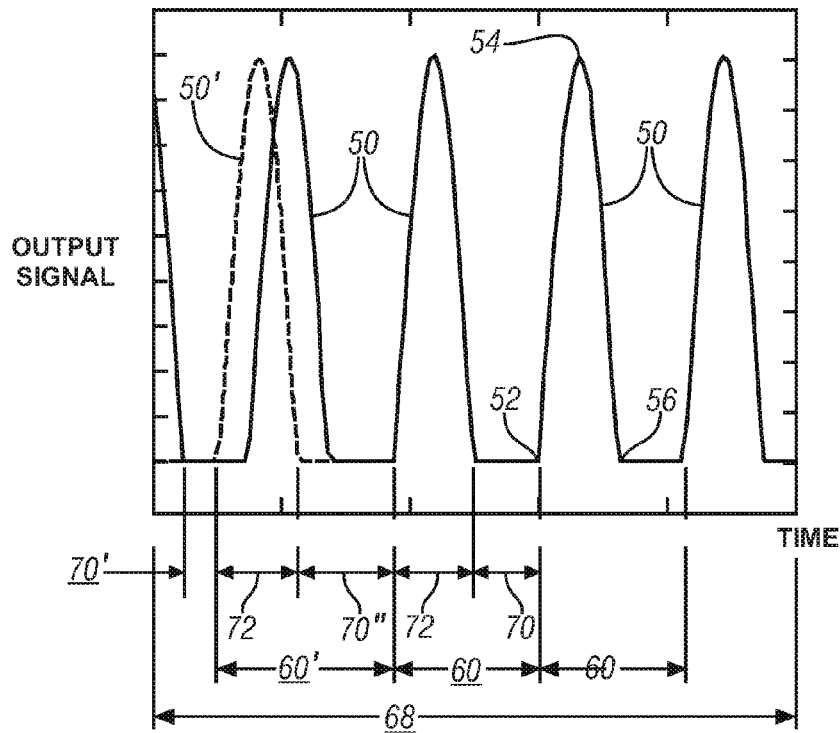
FIG. 3 is a graphical representation of exemplary data showing sensed tooth detection over a specified time period from a rotational sensor, in accordance with the present disclosure.

FIG. 3 is a graphical representation of exemplary data from an exemplary rotational sensor configured to monitor a rotatable element including a toothed element over a specified time period, e.g., 25 ms, depicted in relation to FIG. 2. Exemplary rotational sensors include the first and second output rotational sensors 38 and 40. Exemplary rotatable elements include the output member 24, the first half-shaft 20, and the second half-shaft 21. Exemplary toothed elements includes toothed element 82. When the rotatable element rotates, the toothed element 82 rotates. An output signal 50 is generated as each of the teeth 88 passes the rotational sensor. A full signal has a profile that includes a starting point 52, a peak 54, an ending point 56 and dwell 70. The elapsed time between the starting point 52 and the ending point 56 is signal duration 72. The elapsed time between the ending point 56 of one output signal 50 and the starting point 52 of an adjacent, subsequent output signal 50 is dwell 70. The combined signal duration 72 and dwell 70 is a signal period 60.

When the rotatable element rotates at a constant speed, a periodic pattern emerges. When the rotation speed increases, the signal duration 72 and the dwell 70 between each sensed tooth decreases, thereby causing a shorter signal period. As the rotation speed increases, an increase in the number of teeth sensed during a given sample window 68 also increases. When the rotation speed decreases, the signal duration 72 and the dwell 70 between each output signal increases, thereby causing a longer signal period. As the rotation speed decreases, the number of teeth sensed during the given sample window 68 also decreases.

The positional identifier 86 produces a signal that is of similar shape as the remainder of the teeth 88 however it creates an initial identifier dwell 70' that is less than the remaining dwells 70. The positional identifier 86 has a sensed profile similar in amplitude and signal duration 72 as the remainder of the teeth 88. Likewise, subsequent tooth 88" generates subsequent identifier dwell 70" following an identifier profile 50' that is longer than the remainder dwells 70.

The controller 5 is able to identify the change in both initial and subsequent identifier dwells 70', 70", thereby positively locating the positional identifier 86 and therefore the rotational position of the output member 24. The controller 5 can then calculate a correction factor to adjust for any error that may be introduced through calculation or gear slip as the controller 5 is able to identify an exact rotational position of the toothed element 82. It will be appreciated that although the description includes a short initial dwell 70', the initial dwell 70' may instead be long and the subsequent dwell 70" may be short. It will further be appreciated that the control module 5 can detect operation with respect to forward or rearward output member rotation due to the asymmetrical nature of the dwells adjacent the positional identifier 86.

Figure 4:
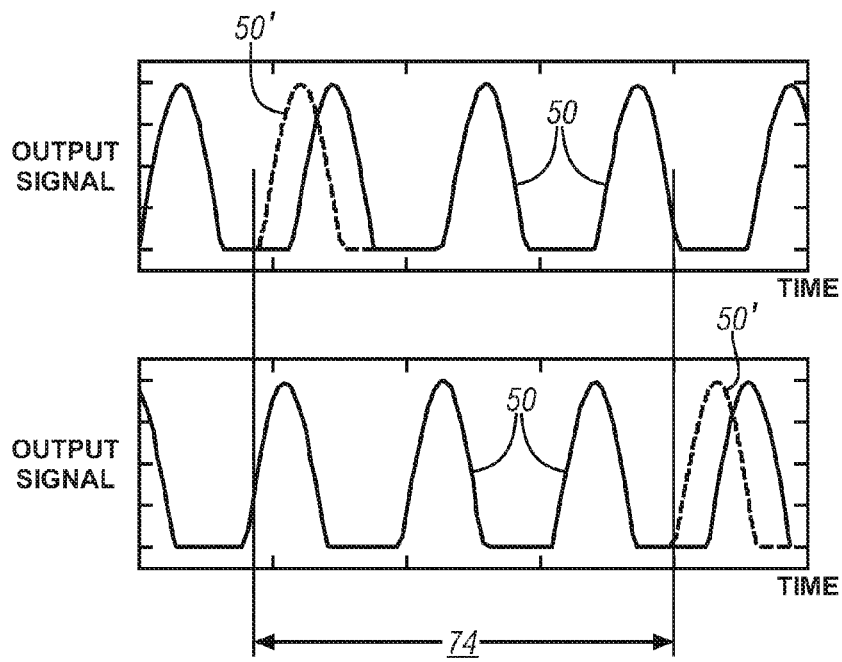
FIG. 4 is a graphical representation of exemplary data showing sensed tooth detection over a specified time period from multiple rotational sensors, in accordance with the present disclosure.

FIG. 4 is a graphical representation of exemplary data showing sensed tooth detection over a specified time period, i.e., 25 ms, from multiple rotational sensors, e.g., the first and second output rotational sensors 38 and 40. The upper graph depicts data from a first rotational sensor, e.g., first output rotational sensor 38, and the lower graph depicts data from a second rotational sensor, e.g., second output rotational sensor 40. The first and second output rotational sensors, e.g., 38 and 40, are indexed as secured onto the output member 24 such that the control module 5 has a reference to the respective positional identifier 86 locations in relation to one another under a zero torque condition. Additionally, the control module 5 may have a learning period wherein the control module 5 locates relative position of the positional identifiers 86. In either case, the control module 5 records a positional relationship 74 between the two positional identifiers 86.

Once the positional relationship 74 is established, the control module 5 is able to use it as a reference in detecting a variation in the rotational position between the two respective positional identifiers 86 and the remaining teeth 88 and make appropriate phase corrections as required. The rotational position variation may be described as a twist angle which is an angle between the first and second output rotational sensors, e.g., 38 and 40, from which a magnitude of driveline torque being transmitted through the rotating element, e.g., the output member 24, can be determined. It will be appreciated that although a single positional identifier 86 for each toothed element 82 is discussed herein in detail, there may be multiple positional identifiers 86 located on a single toothed element 82.

When the positional identifier 86 does not appear in the sample window for each of the first and second output rotational sensors 38, 40, an angle of rotation Θ can be determined based on a comparison of a common sample window, e.g., 25 ms, for each sensor. The angle of rotation Θ is the magnitude of shaft rotation as measured in degree angles. Other suitable metrics such as radians can be used. By comparing the angles of rotation Θ from two rotational sensors, e.g., the output rotational sensor 38 and the first rotational sensor 40, a twist angle therebetween can be determined and related torque value calculated. An angle of rotation Θ can be calculated by determining a phase angle Ø for an initial signal and a final signal, Øinit and Øfinal respectively, and the number of intermediate signals within the sample window 68. The initial phase angle Øinit is determined by knowing a first signal period t1 (measured from the beginning of the sample window 68 to the ending point of the first sensed tooth output), a reference full signal period (preferably the subsequent or preceding adjacent signal period—e.g. P1 measured from the starting point of the first full sensed tooth output to the starting point of the next sensed tooth output, or alternatively a temporally close subsequent or preceding signal period, or an average of temporally close full signal periods), and the total number of teeth Nt on the sensor as determined by the following equation. It will be appreciated that the initial signal period t1 may encompass only a portion of a full signal period.

$$\phi_{init} = \left[\frac{t1}{(Nt \cdot P1)}\right]360 \quad [1]$$

The final phase angle Øfinal is determined by knowing a last signal period t2 (measured from starting point of the last sensed tooth output to the end of the sample window 68), a reference full signal period (preferably the subsequent or preceding adjacent signal period—e.g. P2 measured from the starting point of the last full sensed tooth output to the starting point of the last sensed tooth output, or alternatively a temporally close subsequent or preceding signal period, or an average of temporally close full signal periods), and the total number of teeth Nt on the sensor as determined by the following equation. It will be appreciated that the final signal period t2 may encompass only a portion of a full signal period.

$$\phi_{final} = \left[\frac{t2}{(Nt \cdot P2)}\right]360 \quad [2]$$

The overall angle of rotation Θr(i) during the sample window 68 can be calculated for the specific sensor as the summation of the initial and final phase angles and an intermediate phase angle in accordance with the following equation:

$$\Phi r(i) = \phi init(i) + \phi final(i) + \left(\frac{Nw(i)}{Nt}\right) \cdot 360 \quad [3]$$

where i is the index of the sample window, e.g., 25 ms, and Nw(i) is the number of complete teeth sensed, and $$\left(\frac{Nw(i)}{Nt}\right) \cdot 360$$

is the intermediate phase angle. Therefore, an accumulated rotation over time since the most recent reference determined through the positional identifiers can be calculated by the following equation.

$$\Theta r(N) = \Sigma \Phi r(i) \quad [4]$$

Since the initial and final phase angles are estimated using the full signal periods nearby the limits of the sample window 68, errors can be introduced since signal periods during the sample window may change. Therefore, a constraint is introduced to ensure the sum of a final phase angle of the previous sample window 68 and an initial phase angle of the current sample window 68 is equivalent to the angle of rotation of a full signal period as follows.

$$\phi_{init(i+1)} + \phi_{final(i)} = \frac{360}{Nt} \quad [5]$$

When the positional identifier 86 is detected in the sample window for either of the first and second output rotational sensors 38, 40, rotational angle at the sensor can be calculated similarly as above by taking into account the changes in both initial or/and subsequent identifier dwells 70', 70".

The angle of rotation Θ is determined for the first output rotational sensor 38 as Θom and second output rotational sensor 40 as Θd. The twist angle ΔΘ is represented by the difference between Θom and Θd and torque variation for the output member 24 during the sample window can be determined by the following equation:

$$Tom = Keq \cdot \Delta\Theta = Keq \cdot (\Theta om - \Theta d) \quad [6]$$

where Tom is the torque on the output member 24, Keq is the representative stiffness between the first output sensor 38 and the second output rotational sensors 40, Θom is the angle of rotation at the output rotational sensor 38 located on the output member 24 during the sample window, Θd is the angle of rotation at the second output rotational sensor 40 located on the output member 24 during the sample window. Since both rotational sensors are located on the output member 24, the coefficient Keq is set to the stiffness of the output member or Kom. One having ordinary skill in the art will recognize that Keq is dependent upon the particular driveline configuration and locations of the rotational sensors.

After the control module 5 locates relative position of the positional identifiers 86 from both the output rotational sensors 38, 40, the positional relationship 74 may be used to correct the reference in the twist angle ΔΘ in equation [6]. The rotational angle tracking and the reference correction through the positional identifiers can be scheduled to maximize the accuracy in determining the absolute rotational angle of the shaft between both the output rotational sensors 38, 40 to estimate the driveline torque.

It will be apparent that any output from a rotational sensor can be utilized for the above rotational angle calculations. The calculations only require one intermediate full signal period and partial initial and final signal periods within the sample window. It will be apparent that as described above that partial initial and final signal periods may include full signal periods.

The sample window 68 can be adjusted based on the specific vehicle to be monitored, vehicle speed, or other design considerations. In one embodiment, the sample window 68 is adjusted based on the vehicle speed. The sample window 68 can be continuously adjusted or adjusted in discrete sample window increments based on current speed. In either case, the sample window 68 is sized such that at least one signal period is detected. One signal period is necessary to calculate the angular rotation, and therefore, is necessary to calculate torque. Therefore, sample window 68 adjustment is based on speed, e.g., vehicle speed or shaft rotational speed, includes using longer sample window s for slower speeds and shorter sample windows for higher speeds for both increasing and decreasing speeds.

It will be apparent that Eq.[6] calculates rotation based on angle incrementing of the respective teeth of the rotational sensors. Since the positional relationship 74 between the two positional identifiers 86 is used for reference correction, the torque calculated is an absolute torque. Absent the positional identifiers and known positional relationship, relative torque determinations are made. Additional details respecting relative torque determination can be found in commonly owned and co-pending U.S. application Ser. No. 12/892,832 the contents of which are incorporated herein by reference.

Figure 5:
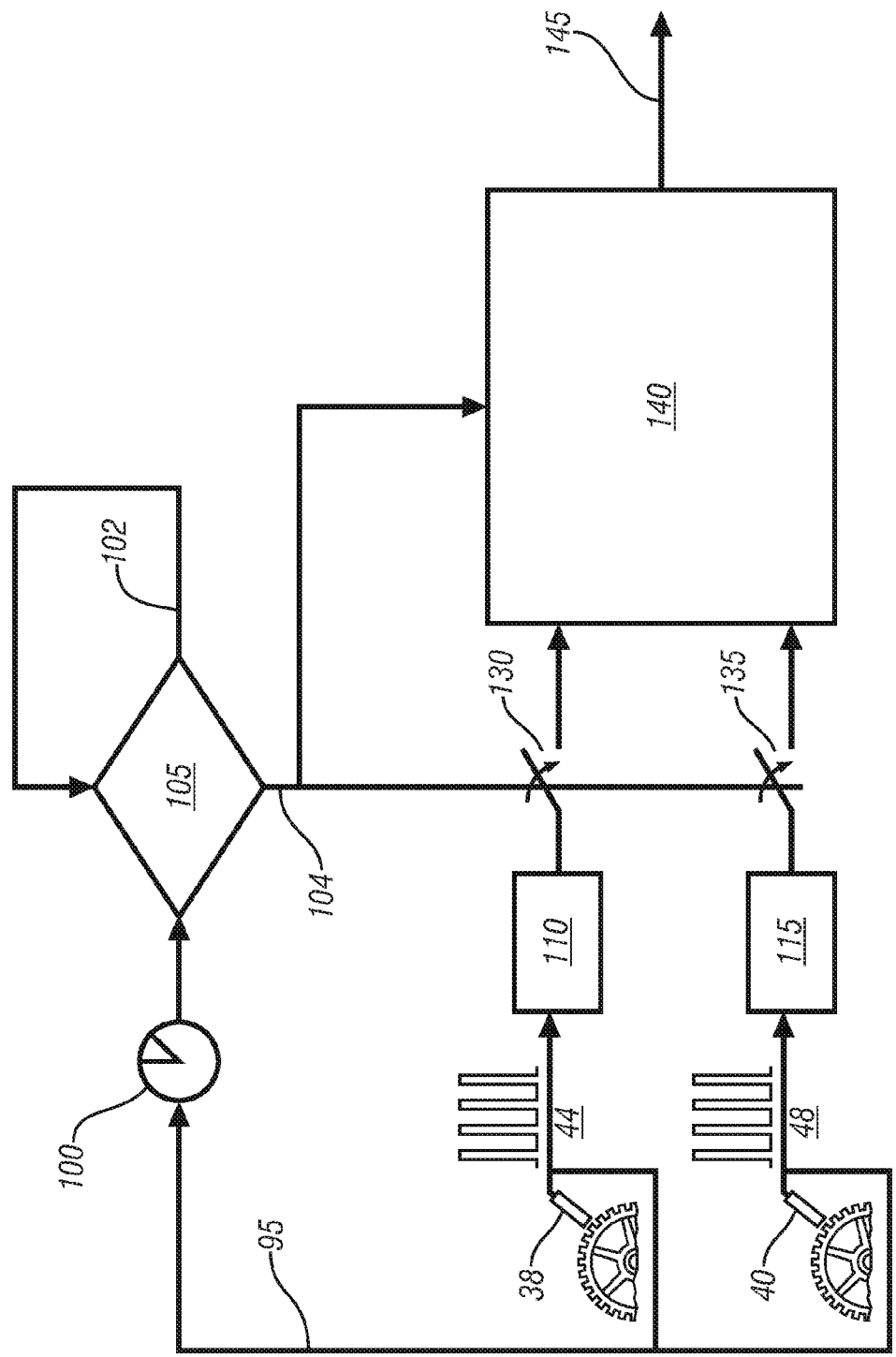
FIG. 5 depicts an exemplary control scheme for calculating torque from rotational sensor data, in accordance with an embodiment of the disclosure.

FIG. 5 depicts an exemplary control scheme for calculating torque from rotational sensor data in accordance with an embodiment of the disclosure. As the vehicle begins to accelerate, the first and second output rotational sensors, e.g., 38, 40, produce first speed data 44 and second speed data 48 respectively, collectively known as speed data 95. The first speed data 44 is output to a timer 100 and a first speed buffer 110. The second speed data 48 is output to the timer 100 and a second speed buffer 115. The timer 100 monitors the speed data 95 at 105. If the speed data 95 does not include at least one full signal period in addition to a preceding partial signal period (corresponding to a preceding tooth 88') and a subsequent partial signal period (corresponding to a following tooth 88"), the timer 100 continues monitoring using feedback loop 102. The timer 100 determines a main sampling time such that the speed data 95 includes a complete sensed tooth, i.e., starting point 52, peak 54, and ending point 56, at 105 for each of the first and second rotational sensors 38, 40 and is input to calculation block 140.

When the timer 100 detects a main sampling time such that the speed data 95 includes a complete sensed tooth indicated at 104, the timer 100 switches a first switch 130 and second switch 135 to the first speed buffer 110 and second speed buffer 115 respectively. The buffered data from the first speed buffer 110 and second speed buffer 115 is passed to a calculation block 140 for calculating relative position of the shaft and then absolute torque 145 when the positional identifiers 86 are detected as described above. The calculation block 140 also calculates phase correction when it has been determined an error in calculation has the positional identifiers 86 out of phase. The calculated torque 145 is output for use by the control module 5 in control of the hybrid powertrain system 26 in response to the operator torque request using a suitable torque control scheme.

Figure 6:
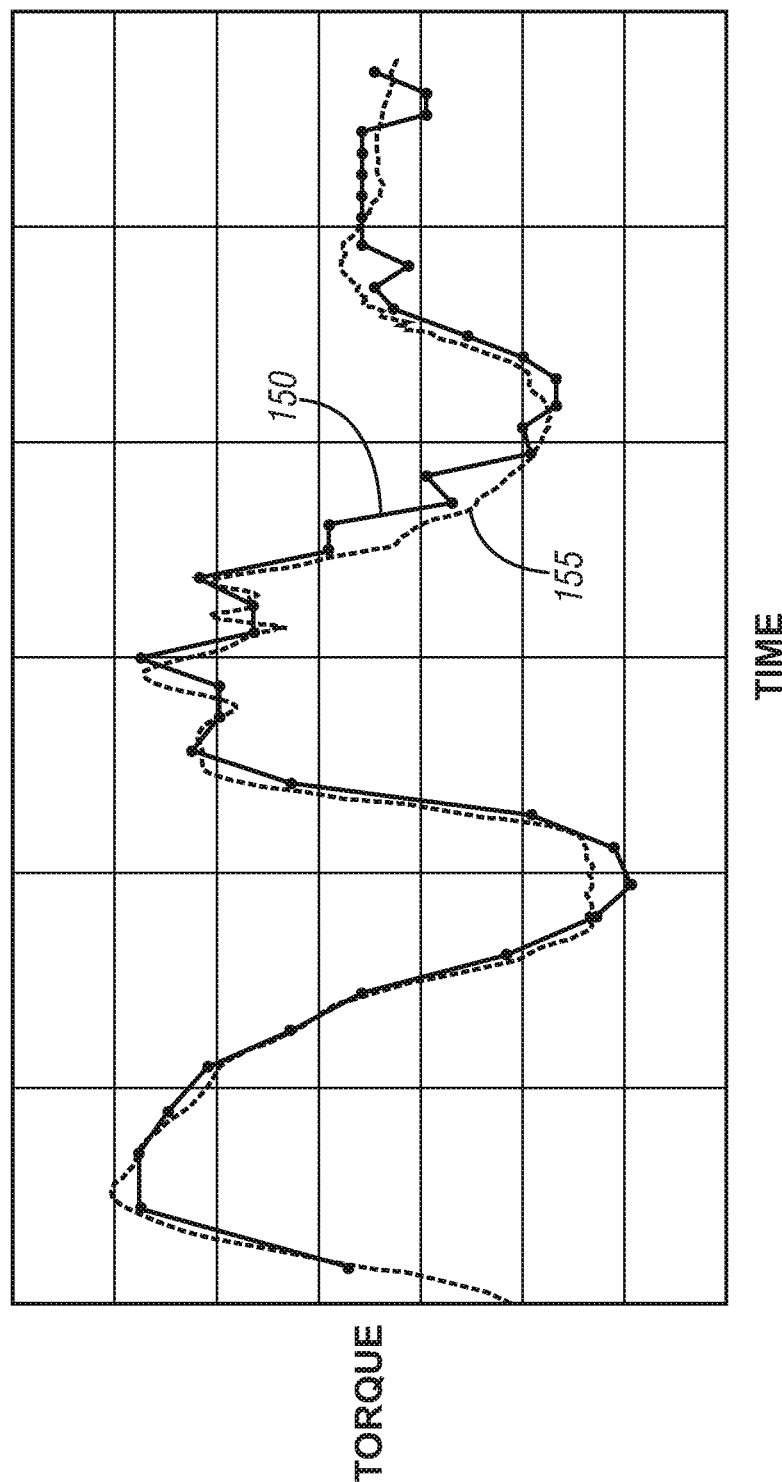
FIG. 6 is graphical data taken from operation of an embodiment of the disclosure during vehicle operation over a course of accelerations and decelerations indicating calculated torque and measured torque over time, in accordance with the present disclosure.

FIG. 6 is graphical data taken from operation of an embodiment of the disclosure during vehicle operation over a course of accelerations and decelerations indicating calculated torque 150 and measured torque 155 over time. The vehicle is accelerated then decelerated by dethrottling. The vehicle is reaccelerated followed by a series of fast throttle apply and lift procedures until a coast down occurs. The vehicle is then accelerated and a constant speed is maintained. Throughout the entire vehicle test, the calculated torque 150 closely matches that of the measured torque 155 resulting in a close correlation between the calculated torque 150 and the measured torque 155.

It will be apparent to one of ordinary skill in the art that although a rear wheel drive vehicle driveline is depicted herein, the disclosure is not so limited. The rear wheel drive layout was chosen for convenience in explaining the proper function and is intended to be utilized in other drivetrain configurations, including, but not limited to, front wheel drive, all wheel drive, and four wheel drive.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. System for monitoring torque in a powertrain including a transmission coupled to a driveline, comprising:
 a first rotational sensor monitoring rotation of the driveline at a first location;
 a second rotational sensor monitoring rotation of the driveline at a second location;
 each of said first and second rotational sensors providing a respective positional identifier indexed to the driveline;
 a controller monitoring signals from the first rotational sensor and the second rotational sensor;
 determining a positional relationship between the first and second locations using the positional identifiers, wherein determining the positional relationship between the first and second locations using positional identifiers comprises indexing the positional identifiers located on the first and second rotational sensors for assembly on shaft elements of the driveline;
 deriving a twist angle from the positional relationship between the first and second rotational sensors;
 calculating a magnitude of driveline torque corresponding to the twist angle; and
 controlling the vehicular powertrain according to the calculated magnitude of driveline torque.

2. Method for monitoring torque in a powertrain including a transmission coupled to a driveline, the method comprising:
 monitoring signal outputs from a first rotational sensor and a second rotational sensor configured to monitor respective rotational positions of first and second locations of a driveline;
 determining a positional relationship between the first and second locations using positional identifiers of the first and second rotational sensors;
 deriving a twist angle from the positional relationship between the first and second rotational sensors;
 calculating a magnitude of driveline torque corresponding to the twist angle; and
 controlling the vehicular powertrain according to the calculated magnitude of driveline torque;
 wherein determining the positional relationship between the first and second locations using positional identifiers of the first and second rotational sensors comprises indexing the positional identifiers located on the first and second rotational sensors for assembly on shaft elements of the driveline.

3. Method for monitoring torque in a powertrain including a transmission coupled to a driveline, the method comprising:
 monitoring signal outputs from a first rotational sensor and a second rotational sensor configured to monitor respective rotational positions of first and second locations of a driveline;
 determining a positional relationship between the first and second locations using positional identifiers of the first and second rotational sensors;
 deriving a twist angle from the positional relationship between the first and second rotational sensors;
 calculating a magnitude of driveline torque corresponding to the twist angle; and
 controlling the vehicular powertrain according to the calculated magnitude of driveline torque;
 wherein determining the positional relationship between the first and second locations using positional identifiers of the first and second rotational sensors comprises executing a learning period wherein locations of the positional identifiers and the positional relationship are learned under zero torque.

4. Method for monitoring torque in a powertrain including a transmission coupled to a driveline, the method comprising:
 monitoring signal outputs from a first rotational sensor and a second rotational sensor configured to monitor respective rotational positions of first and second locations of a driveline;
 determining a positional relationship between the first and second locations using positional identifiers of the first and second rotational sensors;

deriving a twist angle from the positional relationship between the first and second rotational sensors;

calculating a magnitude of driveline torque corresponding to the twist angle; and controlling the vehicular powertrain according to the calculated magnitude of driveline torque;

wherein deriving the twist angle from the positional relationship between the first and second rotational sensors comprises calculating a rotational angle difference between the first and second rotational sensors.

5. Method for monitoring torque in a powertrain including a transmission coupled to a driveline, the method comprising:

monitoring signal outputs from a first rotational sensor and a second rotational sensor configured to monitor respective rotational positions of first and second locations of a driveline;

determining a positional relationship between the first and second locations using positional identifiers of the first and second rotational sensors;

deriving a twist angle from the positional relationship between the first and second rotational sensors;

calculating a magnitude of driveline torque corresponding to the twist angle; and controlling the vehicular powertrain according to the calculated magnitude of driveline torque;

wherein determining the positional relationship between the first and second locations using positional identifiers of the first and second rotational sensors comprises determining a correction factor.

6. Method for monitoring torque in a powertrain including a transmission coupled to a driveline, the method comprising:

monitoring signal outputs from a first rotational sensor and a second rotational sensor configured to monitor respective rotational positions of first and second locations of a driveline;

determining a positional relationship between the first and second locations using positional identifiers of the first and second rotational sensors;

deriving a twist angle from the positional relationship between the first and second rotational sensors;

calculating a magnitude of driveline torque corresponding to the twist angle; and controlling the vehicular powertrain according to the calculated magnitude of driveline torque;

wherein determining the positional relationship between the first and second locations using positional identifiers of the first and second rotational sensors comprises identifying a single positional identifier on each of the first and second rotational sensors.

7. Method for monitoring torque in a powertrain including a transmission coupled to a driveline, the method comprising:

monitoring signal outputs from a first rotational sensor and a second rotational sensor configured to monitor respective rotational positions of first and second locations of a driveline;

determining a positional relationship between the first and second locations using positional identifiers of the first and second rotational sensors;

deriving a twist angle from the positional relationship between the first and second rotational sensors;

calculating a magnitude of driveline torque corresponding to the twist angle; and controlling the vehicular powertrain according to the calculated magnitude of driveline torque;

wherein determining the positional relationship between the first and second shaft locations using positional identifiers of the first and second rotational sensors comprises identifying multiple positional identifiers on each of the first and second rotational sensors.

8. Method for monitoring torque in a powertrain including a transmission coupled to a driveline, the method comprising:

monitoring signal outputs from a first rotational sensor and a second rotational sensor configured to monitor respective rotational positions of first and second locations of a driveline;

determining a positional relationship between the first and second locations using positional identifiers of the first and second rotational sensors;

deriving a twist angle from the positional relationship between the first and second rotational sensors;

calculating a magnitude of driveline torque corresponding to the twist angle; and controlling the vehicular powertrain according to the calculated magnitude of driveline torque;

wherein deriving the twist angle from the positional relationship between the first and second rotational sensors comprises identifying a respective starting phase angle and a respective ending phase angle during a sample window for each of the first and second rotational sensors.

9. Method for monitoring torque in a powertrain including a transmission coupled to a driveline, the method comprising:

monitoring signal outputs from a first rotational sensor and a second rotational sensor configured to monitor respective rotational positions of first and second locations of a driveline;

determining a positional relationship between the first and second locations using positional identifiers of the first and second rotational sensors;

deriving a twist angle from the positional relationship between the first and second rotational sensors;

calculating a magnitude of driveline torque corresponding to the twist angle; and controlling the vehicular powertrain according to the calculated magnitude of driveline torque;

wherein monitoring signal outputs from the first rotational sensor and the second rotational sensor comprises selecting a sample window wherein at least one full signal is sensed.

10. The method of claim 9, wherein said sample window comprises a partial signal preceding said at least one full signal and a partial signal succeeding said at least one full signal.

11. Method for monitoring torque in a powertrain including a transmission coupled to a driveline, the method comprising:

monitoring signals from a first rotational sensor and a second rotational sensor within a sample window wherein at least one full signal is sensed, said sensors configured to monitor respective rotational positions of first and second locations of a driveline, said first rotational sensor located on a transmission output member proximal to the transmission, and said second rotational sensor located on the transmission output member distal relative to the first rotational sensor;

determining a positional relationship between the first and second locations using positional identifiers of the first and second rotational sensors;

deriving a twist angle from the positional relationship between the first and second rotational sensors;

calculating a magnitude of driveline torque corresponding to the twist angle; and controlling the vehicular powertrain according to the calculated magnitude of driveline torque;

wherein the sample window comprises at least one full signal and a partial signal preceding said at least one full signal and a partial signal succeeding said at least one full signal.

12. The method of claim 11, wherein deriving the twist angle from the positional relationship between the first and second rotational sensors comprises identifying a respective starting phase angle and a respective ending phase angle during a sample window for each of the first and second rotational sensors.

13. The method of claim 11, wherein deriving the twist angle from the positional relationship between the first and second rotational sensors comprises calculating a phase angle between the first and second rotational sensors.

14. The method of claim 11, wherein calculating the magnitude of driveline torque corresponding to the twist angle comprises a stiffness coefficient of the driveline.

15. The method of claim 11, wherein deriving the twist angle from the positional relationship between the first and second rotational sensors comprises calculating a phase correction.

16. The method of claim 11, wherein determining the positional relationship between the first and second driveline locations using positional identifiers of the first and second rotational sensors comprises indexing the positional identifiers.

17. The method of claim 11, wherein determining the positional relationship between the first and second driveline locations using positional identifiers of the first and second rotational sensors comprises learning the locations of the positional identifiers.

* * * * *